United States Patent
Görl et al.

(10) Patent No.: US 6,433,064 B1
(45) Date of Patent: Aug. 13, 2002

(54) RUBBER POWDER COMPOSITIONS AND PROCESS FOR THE PRODUCTION THEREOF

(75) Inventors: Udo Görl, Recklinghausen; Reinhard Stober, Hasselroth; Hartmut Lauer, Bad Soden; Uwe Ernst, Marl, all of (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 0 days.

(21) Appl. No.: 09/459,975

(22) Filed: Dec. 14, 1999

(30) Foreign Application Priority Data

Dec. 18, 1998 (DE) .......................... 198 58 706

(51) Int. Cl.⁷ ................................. C08K 3/34
(52) U.S. Cl. ................. 524/492; 524/261; 524/394; 524/442; 524/493; 524/495; 524/496; 524/430; 524/432
(58) Field of Search ................. 524/261, 442, 524/493, 494, 492, 495, 496, 430, 432, 394

(56) References Cited

U.S. PATENT DOCUMENTS

| | | | |
|---|---|---|---|
| 3,654,218 A | | 4/1972 | Clas et al. |
| 4,073,755 A | | 2/1978 | Berg et al. |
| 4,250,082 A | * | 2/1981 | Sommer et al. .......... 260/42.55 |
| 4,297,145 A | * | 10/1981 | Wolff et al. .............. 106/308 Q |
| 4,514,231 A | * | 4/1985 | Kerner et al. ................ 106/309 |
| 4,517,335 A | * | 5/1985 | Wolff et al. .................. 524/552 |
| 4,621,121 A | * | 11/1986 | Schwarze et al. ........ 525/329.3 |
| 4,704,414 A | * | 11/1987 | Kerner et al. ................ 523/213 |
| 4,788,231 A | * | 11/1988 | Smigerski et al. ........... 523/334 |
| 5,143,962 A | * | 9/1992 | Wolff et al. .................. 524/346 |
| 5,159,009 A | * | 10/1992 | Wolff et al. .................. 524/495 |
| 5,846,506 A | * | 12/1998 | Esch et al. .................... 423/338 |
| 6,123,762 A | * | 9/2000 | Barthel et al. ............... 106/490 |
| 6,156,822 A | * | 12/2000 | Materne et al. .............. 523/212 |

FOREIGN PATENT DOCUMENTS

| | | |
|---|---|---|
| DE | 28 22 148 | 12/1979 |
| DE | 3723213 | 1/1989 |
| DE | 3723214 | 1/1989 |
| DE | 19816972 | 11/1999 |
| EP | 0 177 674 | 4/1986 |
| EP | 0 442 143 | 8/1991 |
| EP | 0 519 188 | 12/1992 |
| EP | 0 795 579 | 9/1997 |
| EP | 0824131 | 2/1998 |

OTHER PUBLICATIONS

European Search Report for European Application No. 99123062, published Mar. 24, 2000.

* cited by examiner

*Primary Examiner*—Edward J. Cain
(74) *Attorney, Agent, or Firm*—Smith, Gambrell & Russell, LLP

(57) ABSTRACT

Finely divided, pulverulent rubbers containing filler which contain further processing and vulcanization auxiliaries necessary for the production of vulcanizable rubber mixtures, which rubbers are pourable even after exposure to mechanical action, and to a process for the production thereof. The rubber powder is obtained within two precipitation steps. These rubber powders are used for the production of vulcanizable rubber mixtures. The fillers used, which comprise not only precipitated silicas but also carbon blacks known in the rubber industry, are optionally surface modified with organosilicon compounds.

27 Claims, No Drawings

RUBBER POWDER COMPOSITIONS AND PROCESS FOR THE PRODUCTION THEREOF

INTRODUCTION AND BACKGROUND

The present invention relates to rubber powders which also contain, in addition to the rubber components, further constituents important for the production of the vulcanizable rubber mixture. Thus, the invention relates to rubber powder compositions, products made therefrom and process for obtaining said compositions.

If, in addition to the constituents of the basic batch, the rubber powder also contains crosslinking chemicals (accelerator, sulfur), it is known as a full compound. If the rubber powder in particular consists of the constituents of the basic batch, it is known as a "semi-compound." Intermediate forms between these stages are also suitable. These terms are known in the art.

Numerous documents have been published relating to the aim and purpose of using rubber powders (powdered rubbers) and relating to processes for the production thereof.

The interest in pulverulent rubbers is explained by the processing methods used in the rubber industry, where rubber mixtures are produced with a considerable input of time, energy and labor. The main reason for this is that the raw material, crude rubber, is in the form of bales.

The bale is comminuted and intimately mixed during the course of several processing stages with fillers, mineral oil plasticizers and vulcanization auxiliaries in roll mills or internal mixers. The mixture is generally stored between the stages. Extruder/pelletizers or extruder/roller dies are generally arranged downstream from the internal mixers or roll mills. The only way forward from this highly complex method of rubber processing is to develop an entirely new processing technology. The use of free-flowing rubber powders has thus been discussed for some time as this approach makes it possible to process rubbers mixtures simply and rapidly in the same way as powdered thermoplastics.

German Patent 2822 148 discloses a process for the production of a pulverulent rubber containing filler.

According to this German patent, an aqueous filler emulsion is added to a rubber latex, rubber solution or the aqueous emulsion of a rubber and the desired rubber powder is precipitated. In order to avoid the particle size dependent filler contents obtained from this process, variants of this process have been filed under German patents 3723 213 and 3723 214 and are part of the prior art. According to German patent 3723 213, in a two-stage process, a quantity of ≦50% of the filler is initially incorporated into the particles of rubber powder. In the second stage, the remainder of the filler is applied onto the so-called basic rubber particle. This may be considered a variant of dusting, as no bond is created between the filler and rubber.

However, as E. T. Italiaander has pointed out (presentation 151, technical conference of the Rubber Division of the ACS, Anaheim, Calif., May, 6–9, 1997 (GAK 6/1997 (50) 456–464)), despite the bright future predicted in the Delphi Report (Delphi Report, "Künftige Herstellverfahren in der Gummiindustrie", Rubber Journal, volume 154, no. 11, 20–34 (1972)) for pulverulent and pelletized rubbers and numerous attempts made by well-known polymer manufacturers from the mid 1970's until the early 1980's to produce pulverulent NBR, SBR/carbon black masterbatches and pelletized NR, the rubber bale remains the standard form in which polymers are supplied.

One disadvantage of known processes is firstly that a grinding operation is necessary in order to achieve a particle diameter of the filler particles of 10 (m, which is considered essential to the quality of the final product.

However, this requires not only elevated energy input but also results in damage to the filler structure which, together with the active surface area, is a significant parameter for its efficacy in rubber applications.

Secondly, the handling properties of prior art products suffer in that the particles stick together during storage.

It is accordingly, an object of the invention is to provide a pulverulent, free-flowing rubber containing filler which is easily processed, together with a process for the production thereof.

SUMMARY OF THE INVENTION

The above and other objects of the invention can be achieved by a finely divided, free-flowing rubber powder composition, which
 a) contains a rubber matrix and additionally
 b) one or more white and/or black fillers known from the rubber industry optionally modified with one or more of the organosilicon compounds of the formulae (I), (II) or (III) as hereinafter described,
 c) one of more of the additives known for the production of rubber vulcanizates.

All or part of the filler may be used in premodified form or may have been modified during the present process.

Depending upon the extent of processing (nature of the added mixture components), the product may be designated a semi-compound or full compound.

The rubber powder in particular contains the organosilicon compounds in a form which has reacted with the filler if a silicate filler, in particular a precipitated silica, is used.

The particle size range of the rubber powders according to the invention is generally between 0.05 and 10 mm, in particular between 0.5 and 2 mm.

The rubber powders according to the invention exhibit a narrower size distribution which is shifted towards smaller particle sizes than is known from the prior art (Kautschuk+Gummi+Kunststoffe 7, 28 (1975) 397–402). This fact facilitates processing of the powders. Moreover, due to the production process, the filler content of the individual particles is not determined by particle size. The pulverulent rubbers contain from 20 to 250 phr, in particular from 50 to 100 phr (phr: parts per hundred parts of rubber), of filler, part or all of which has optionally been surface modified before the process according to the invention using the organosilicon compounds herein described of the formulae (I), (II) or (III) known in the rubber industry. The following, individually or as mixtures, have proved to be suitable types of rubber: natural rubber, emulsion SBR having a styrene fraction of 10 to 50%, butyl/acrylonitrile rubber, butyl rubbers, terpolymers prepared from ethylene, propylene (EPM) and unconjugated dienes (EPDM), butadiene rubbers, SBR, produced using the solution polymerization process, having styrene contents of 10 to 25%, as well as 1,2-vinyl constituent contents of 20 to 55% and isoprene rubbers, in particular 3,4-polyisoprene.

In addition to the stated rubbers, the following elastomers may be considered, individually or as mixtures: carboxyl rubbers, epoxy rubbers, trans-polypentenamer, halogenated butyl rubbers, rubbers prepared from 2-chlorobutadiene, ethylene/vinyl acetate copolymers, epichlorohydrins, optionally also chemically modified natural rubber, such as for example epoxidized grades. Fillers which are generally used are the carbon blacks known from rubber processing and white fillers of a synthetic nature, such as for example precipitated silicas or natural fillers, such as for example siliceous chalk, clays etc. are additionally used.

Carbon blacks, as are generally used in rubber processing, are particularly suitable.

Such carbon blacks include furnace blacks, gas blacks and lamp backs having an iodine absorption value of 5 to 1000 $m^2/g$, a CTAB value of 15 to 600 $m^2/g$, a DBP adsorption of 30 to 400 ml/100 g and a 24 M4 DBP value of 50 to 370 ml/100 g in a quantity of 5 to 250 parts, in particular of 20 to 150 parts, per 100 parts of rubber, in particular of 40 to 100 parts.

Silicate fillers of synthetic or natural origin known from the rubber sector, in particular precipitated silicas, are also suitable.

These generally have an $N_2$ surface area, determined using the known BET method, of 35 to 700 $m^2/g$, a CTAB surface area of 30 to 500 $m^2/g$, a DBP value of 150 to 400 ml/100 g. The product according to the invention contains these silicas in a quantity of 5 to 250 parts, in particular of 20 to 100 parts, relative to 100 parts of rubber. If the fillers comprise white natural fillers, such as clays or siliceous chalks having an $N_2$ surface area of 2 to 35 $m^2/g$, these are used in a quantity of 5 to 350 parts, relative to 100 parts of rubber.

Powders containing one or more of the above-stated fillers in the mixture are also suitable.

Apart from the unmodified fillers of the stated type, modified fillers are optionally additionally used in the production of the rubber powders claimed in the present document. The proportion of unmodified fillers depends upon the specific mixture to be produced. In any event, the total quantity of filler amounts to 20 to 250 phr. With regard to the fillers, 100%, in particular of 30 to 100%, preferably of 60 to 100% of this quantity consists of the unmodified fillers: silica and/or carbon black. Surface modification of the filler is generally performed using organosilicon compounds of the general formulae

  (I),

  (II), or

  (III)

in which

B: is —SCN, —SH, —Cl, —NH$_2$ (if q=1) or —S$_x$— (if q=2)

R and R$^1$: are an alkyl group having 1 to 4 carbon atoms, branched or unbranched, the phenyl residue, wherein all residues R and R$^1$ may each have the same or a different meaning, preferably an alkyl group, R: is a $C_1$–$C_4$ alkyl, $C_1$–$C_4$ alkoxy group, branched or unbranched, n: is 0; 1 or 2, Alk: is a divalent linear or branched carbon residue having 1 to 6 carbon atoms, m: is 0 or 1

Ar: is an arylene residue having 6 to 12 C atoms p: is 0 or 1, providing that p and m are not simultaneously 0, x: is a number from 2 to 8, Alkyl: is a monovalent linear or branched unsaturated hydrocarbon residue having 1 to 20 carbon atoms, preferably 2 to 8 carbon atoms, Alkenyl: is a monovalent linear or branched, unsaturated hydrocarbon residue having 2 to 20 carbon atoms, preferably 2 to 8 carbon atoms.

Modified fillers which are used according to the invention are described, for example, in EP-B 0442 143, EP-B 0177 674 and, in particular in pellet form, in EP-A 0795 579 (white fillers) or in EP-B 0519 188 (carbon black).

Bis(alkoxysilylalkyl)oligosulfanes of the bis (trialkoxysilylpropyl)tetrasulfane and -disulfane types have in particular proved suitable for premodification or for addition to the filler suspension.

The modified fillers known from the prior art identified herein or patents or the organosilicon compounds stated therein are explicitly included in the present application as a constituent of the claimed compositions.

Apart from the above-stated fillers, the rubber powders according to the invention in particular contain known processing or vulcanization auxiliaries such as zinc oxide, zinc stearate, stearic acid, polyalcohols, polyamines, resins, waxes, plasticizing oils, anti-ageing agents to counter the action of heat, light or oxygen and ozone, reinforcing resins, flame retardants, such as for example Al(OH)$_3$ and Mg(OH)$_2$, pigments, various crosslinking chemicals and accelerators and optionally sulfur in concentrations conventional in rubber processing, preferably sulfur modified by combination with surface active substances, as is commercially available.

Particle size is determined from the filler suspension.

In a particularly preferred embodiment of the process according to the invention, all the solids used are present in a particle size of <50 μm, preferably of <10 μm, before the rubber particles are precipitated from the suspension. Agglomeration may optionally occur as a result of the production process, but this has no negative influence on processing behavior.

DETAILED DESCRIPTION OF INVENTION

The present invention will now be described in further detail.

The present invention also provides a process for the production of finely divided rubber powders containing filler by precipitation from mixtures containing water, which mixtures contain finely divided filler(s) (carbon black and/or silicate filler) optionally modified with organosilicon compounds, water-soluble salts of a metal of groups IIa, IIb, IIIa and VIII of the periodic system of elements and a rubber latex or the aqueous emulsion of a rubber solution, optionally in the presence of an organic solvent.

The process is of the present invention is carried out as follows:

a) in a first stage, ≧50 wt. %, but less than 100 wt. %, of the intended quantity of finely divided filler, preferably in the form of an aqueous suspension containing 2 to 15 wt. % of water, optionally with a sufficient quantity intended for modification of the filler surface of one or more organosilicon compounds according to the formulae (I), (II) or (III) in a quantity of 0.1 to 20 wt. %, relative to the filler, in particular if the filler is a silicate filler, preferably precipitated silica, and/or ≧50 wt. %, but less than 100 wt. %, of a filler at least partially surface modified with one or more of the organosilicon compounds (formulae (I), (II) or III), in particular in the presence of an emulsifier, are mixed with a rubber latex or an aqueous emulsion of a rubber solution and the pH value of the mixture is reduced to a value in the range from 7.5 to 6.5, in particular by addition of a Lewis acid, b) in a second stage, the remaining proportion (splitting proportion) of the above-stated finely divided fillers, optionally together with the residual quantity intended for modification of the filler surface of organosilicon compounds of the formulae (I), (II) or (III), is added in the form of a suspension, the pH value is reduced to a value in the range from <6.5 to ~5, preferably ~5.5, in particular by addition of a Lewis acid, such that the rubber present in the mixture completely precipitates together with the filler, c) the precipitated solids are separated using measures known per se, d) are optionally washed and e) dried.

The organosilicon compounds are in particular used when silicate fillers, preferably silicas, are used.

The precipitation process is generally performed at room temperature, in particular at 20 to 80° C.

The quantities of filler and rubber are adjusted depending upon the desired end use in accordance with the desired filler content of the resultant rubber.

At a total content of (80 parts of filler phr, 1 to 10 wt. % of the filler is added as the remaining proportion in the second stage.

The resultant particles do not stick together, even under pressure, such as when several sacks of the product are stacked.

This "inertization" of the surface should not be confused with the known technique of dusting tacky powders with fillers. These only superficially adhering fillers are rapidly detached when exposed to mechanical action, for example in conveying plants or on transfer into silos. In such known processes the sticking and agglomeration of the finely divided powders, which it is the intention to avoid, then occurs despite the dusting. Unlike the tacky particles superficially coated with fillers as flow auxiliaries as are known from the prior art, according to the invention, filler particles are incorporated into the surface during the precipitation process for the production of the pulverulent rubber. Depending upon the filler loading with one or more of the above-stated fillers, the advisable distribution between the interior of the particles and an outer zone associated therewith is established.

In a product having an elevated filler loading (≧80 parts of filler per hundred parts of rubber), only 1 to 10 parts of this quantity of filler are incorporated in the outer particle zone.

However, if the pulverulent rubber contains a total of <80 parts of filler per hundred parts of rubber, 10 to 20 parts thereof are preferably incorporated in the outer particle zone (peripheral zone), i.e. the filler does not merely adhere to the rubber by less effective adhesive forces.

The distribution of the filler within the rubber particles and in the so-called peripheral zone of the rubber particles generally vary between these limits.

The greater is the total filler content, the less is the need to suppress the tackiness of the powder by an increased concentration of filler in the peripheral zone.

According to the invention, these proportions of the filler are not applied externally onto the individual rubber particles (c.f. German 37 23213), but are instead incorporated into the rubber surface.

This distribution of the filler and the manner in which the fillers are bonded to the rubber composition bring about the increased flowability of the powders according to the invention and prevent sticking during storage of the powder, without these properties being lost on exposure to mechanical stresses during conveying, transfer into silos and the like.

The above-stated carbon blacks are used as fillers in finely divided (fluffy) form, the carbon blacks generally having an average particle diameter of 1 to 9 $\mu$m, preferably of 1 to 8 $\mu$m, before they are suspended.

This facilitates dispersion, such that aqueous suspensions containing filler particles of an average particle diameter of distinctly less than 10 $\mu$m are obtained without elevated energy input. Precipitated silica may advantageously be used in the form of a filter cake which has been washed until salt-free.

Metal salts which may be considered are those originating from elements of groups IIa, IIb, IIIa and VIII of the periodic system of elements. This division into groups corresponds to the former IUPAC recommendation (Periodisches System der Elemente, Verlag Chemie, Weinheim, 1985).

Typical representatives are magnesium chloride, zinc sulfate, aluminum chloride, aluminum sulfate, iron chloride, iron sulfate, cobalt nitrate and nickel sulfate, wherein the salts of aluminum are preferred. Aluminum sulfate is particularly preferred. The salts are used in a quantity of 0.1 to 6.5 parts by weight, preferably in the form of an aqueous solution, per 100 parts by weight of rubber. Acids suitable for establishing the defined pH values are primarily mineral acids, such as for example sulfuric acid, phosphoric acid and hydrochloric acid, wherein sulfuric acid is particularly preferred. However, carboxylic acids, such as for example formic and acetic acid, may also be used.

The quantity of acid is determined by the nature and quantity of the water-soluble metal salt, the filler, the rubber and the optionally present alkali metal silicate. This quantity may readily be determined by initial investigatory testing.

According to a preferred embodiment of the process according to the invention, up to 5 parts by weight per 100 parts by weight of rubber of silica ($SiO_2$) are additionally used in the form of an alkali metal silicate solution, preferably as water glass having an $Na_2O:SiO_2$ molar ratio of 2:1 to 1:4. The alkali metal silicate solution may here be added both to the rubber component and to the filler suspension. It is preferably added to the rubber component, especially when the process is performed continuously.

The process according to the invention is generally performed as follows: first of all, a filler suspension is produced by dispersing a proportion, preferably ≦50%, of the filler present in the final product, which filler is optionally in part surface modified with compounds according to the formulae (I), (II) or (III), in water together with the metal salt and optionally the alkali metal silicate solution. The overall quantity of water is determined by the nature of the filler and the degree of digestion. In general, the water-insoluble constituents of the filler amount to approx. 6 wt. %. This value is not a binding restriction and both lower and higher quantities may be encountered. The maximum content is limited by the pumpability of the suspension.

The filler suspension produced in this manner is then intimately mixed with the rubber latex optionally containing alkali metal silicate solution or the aqueous emulsion of a rubber solution optionally containing alkali metal silicate solution. Known stirrers, such as for example propeller stirrers, are suitable for this purpose.

After mixing, a pH value in the range from 7.5 to 6.5 is established in the first stage using an acid while stirring is continued. This results in basic rubber particles having a homogeneous filler content. The size of these basic particles is controlled by the selected quantity of metal salt in the range from 0.1 to 6.5 phr. Control is effected by the largest particle size being obtained with the lowest quantity of metal salt.

The solids content of the latex used generally amounts to 20 to 25 wt. %. The solids content of the rubber solutions is generally 3 to 35 wt. %, that of the rubber emulsions generally from 5 to 30 wt. %.

The process according to the invention may be performed both discontinuously and continuously.

The precipitated rubber powder is advantageously separated by means of a centrifuge and then dried to a residual water content of generally ≦1%, in particular in a fluidized bed drier.

During the production process according to the invention, in addition to the preferably used known emulsifiers, such as for example fatty alcohol polyethylene glycol ethers, in a preferred embodiment further processing and optionally vulcanization auxiliaries are generally added to the suspension in a quantity as is conventional for vulcanizable rubber mixtures or also in a smaller quantity.

Such auxiliaries comprise known
a) activators, such as for example stearic acid,
b) antioxidants
c) processing auxiliaries such as resins and/or waxes, which are generally added in quantities of 0.5 to 10 wt. %, relative to the rubber content, directly to the filler suspension or with the latex emulsion/solution. Vulcanization accelerators are further important additions. These are in particular selected from among the classes of sulfenamides, mercapto and sulfide accelerators, as well as thiurams, thiocarbamates and amines, and are generally added in a quantity of 0.1 to 8 wt. %, relative to the rubber content, directly to the filler suspension or with the latex emulsion/solution in finely divided form or in a known oil compatible with the rubber. In a preferred embodiment, the rubber powder containing the above-stated constituents is mixed with the accelerator substances or these are sprayed, for example dissolved in an oil, onto the rubber powder.

The sulfur necessary for vulcanization, in particular in a finely divided (5 to 45 μm) modification combined with surface-active substances, is optionally mixed into the suspension or rubber powder in a quantity of 0.2 to 8 wt. %, relative to the rubber content.

Nonionic, cationic or anionic surfactants are optionally also added as surface-active substances, especially when organosilicon compounds are added to the filler suspension.

The use of finely divided solid compounds is particularly suitable. The particle size range of the above-stated substances is generally below 50 μm, in particular 10 μm.

This facilitates the best possible distribution in the rubber powders according to the invention which are obtained using the process described in the present document. Incorporating generally known zinc salts, in particular zinc oxide, in a quantity of 0.5 to 8 wt. %, relative to the rubber content, is also of particular significance to subsequent use.

A zinc oxide having a specific surface area of between 20 and 50 m$^2$/g is preferably used. This property is associated with the above-stated particle size range of <50 μm, in particular of <10 μm. However, if all or some of the available additions have a particle size range greater than this, it is possible according to the prior art to pass the aqueous suspensions obtained before addition of the rubber content through known, suitable grinding units. Suspensions are then obtained having solids contents of the desired particle size distribution.

In one particular embodiment, the suspension from which the rubber powder according to the invention is precipitated additionally contains a plasticizing oil known as a processing auxiliary in the rubber industry. The purpose of this oil is, inter alia, to improve the processing characteristics of the plasticized crude mixture (injection behavior, extrusion behavior) and it is added either with the rubber latex/emulsion/solution or separately to the suspension.

The rubber powders according to the invention are used for the production of vulcanizable rubber mixtures. The constituents necessary for producing the mixture are all preferably present in the rubber powder.

They may, however, also additionally be mixed with other conventional rubbers, vulcanization auxiliaries and fillers, if this is necessary for the properties of the desired vulcanizate.

It is possible according to the invention directly to produce finely divided rubber powders containing optionally modified fillers and further constituents necessary for vulcanization, which powders are free-flowing and also remain free-flowing after exposure to mechanical stresses (for example conveying, packaging). By virtue of the finely divided nature thereof, no grinding or other comminution measures are required to obtain finely divided products.

The resultant finely divided rubber powders (semi-compounds and full compounds) are readily processable and give rise to vulcanizates having improved properties.

PRODUCTION EXAMPLES

Example I

Production of a Semi-compound in Powder Form Based on E-SBR, N234 and Additions

A stable dispersion is produced by stirring together 5.6 kg of N234, 1 kg of active ZnO, 2.2 kg of oil, 96 g of Marlipal 1618/25, 0.2 kg each of stearic acid, 6PPD and TMQ, 0.6 kg of Rhenosin C 90 in 134.4 L of water. The dispersion is mixed together with 95.69 kg of a 20.9% E-SBR latex emulsion with vigorous stirring. The pH value of the complete mixture is reduced to 6.5 by addition of an approx. 10% $Al_2(SO_4)_3$ solution, so initiating precipitation. At this pH value, another stable dispersion prepared from 4 kg of N234 and 96.0 L of completely deionized water is added and the pH value is then reduced to 6.0 by addition of further $Al_2(SO_4)_3$. After the precipitation process, the great majority of the water is separated mechanically and a drying stage then reduces the residual moisture content to <1%. The finished pulverulent product contains 100 parts of E-SBR and 48 parts of N234 and all added substances. (H-EPB I)

Example II

Production of a Full Compound in Powder Form Based on E-SBR, N234 and Additions

A stable dispersion is produced by initially stirring together 5.6 kg of N234, 1 kg of active ZnO, 96 g of Marlipal 1618/25, 0.32 kg of sulfur and 0.04 kg of MBTS in 126.6 L of completely deionized water. An oil solution is also produced from 2.2 kg of oil with 0.2 kg each of stearic acid, 6PPD and TMQ, 0.6 kg of Rhenosin C90, 0.32 kg of TBBS and heated to 75° C. The oil solution is mixed together with 95.69 kg of a 20.9% E-SBR latex emulsion with vigorous stirring. The above-stated stable dispersion is then added to the latex/oil mixture. The pH value of the mixture is then reduced to 6.5 by addition of an approx. 10% $Al_2(SO_4)_3$ solution (beginning of precipitation). At this pH value, precipitation is interrupted and another stable dispersion prepared from 4 kg of N234 and 96.0 L of completely deionized water is added to the reaction mixture. After this process step, the pH value is further reduced to 5.5 by addition of further quantities of $Al_2(SO_4)_3$. After the precipitation process, the great majority of the water is separated mechanically and a drying stage then reduces the residual moisture content to <1%. The finished pulverulent product contains 100 parts of E-SBR and 48 parts of N234 and all added substances. (F-EPB II)

Example III
Production of a Semi-compound in Powder Form Based on E-SBR, Silica and Additions A stable dispersion is produced by stirring together 12 kg of Ultrasil 7000, 0.98 kg of Si 69, 0.6 kg of active ZnO, 120 g of Marlipal 1618/25 in 108 L of completely deionized water. An oil solution is also produced from 5 kg of oil, 0.2 kg of stearic acid, 0.3 kg of 6PPD, 0.2 kg of Protector G 35 and heated to 75° C. The oil solution is mixed together with 95.69 kg of a 20.9% E-SBR latex emulsion with vigorous stirring. The above-stated stable dispersion is then added to the latex/oil mixture. The pH value is reduced to 7 by addition of an approx. 10% $Al_2(SO_4)_3$ solution. Once the pH value has been reduced to 7, another stable dispersion prepared from 3 kg of Ultrasil 7000, 240 g of Si 69, 40 g of Marlipal and 27 L of completely deionized water is added. Once the dispersion has been added, the pH value is further reduced to 5.5 by means of $Al_2(SO_4)_3$. After the precipitation process, the great majority of the water is separated mechanically and a drying stage then reduces the residual moisture content to <1%. The finished pulverulent product contains 100 parts of E-SBR and 75 parts of Ultrasil 7000 and all added substances. (H-EPB III)

Example IV
Production of a Full Compound in Powder Form Based on E-SBR, Silica and Additions A stable dispersion is produced by stirring together 12 kg of Ultrasil 7000, 0.98 kg of Si 69, 0.6 kg of active ZnO, 120 g of Marlipal 1618/25, 0.3 kg of sulfur in 108 L of completely deionized water. An oil solution is also produced from 5 kg of oil, 0.2 kg of stearic acid, 0.3 kg of GPPD, 0.2 kg of Protector G 35, 0.3 kg of CBS and 0.4 kg of DPG and heated to 75° C. The oil solution is mixed together with 95.69 kg of a 20.9% E-SBR latex emulsion with vigorous stirring. The above-stated stable dispersion is then added to the latex/oil mixture. The pH value is reduced to 7 by addition of an approx. 10% $Al_2(SO_4)_3$ solution. Once the pH value has been reduced to 7, another stable dispersion prepared from 3 kg of Ultrasil 7000, 240 g of Si 69, 40 g of Marlipal and 27 L of completely deionized water is added. Once the dispersion has been added, the pH value is further reduced to 5.5 by means of $Al_2(SO_4)_3$. After the precipitation process, the great majority of the water is separated mechanically and a drying stage then reduces the residual moisture content to <1%. The finished pulverulent product contains 100 parts of E-SBR and 75 parts of Ultrasil 7000 and all added substances. (F-EBP IV)

Example V
Production of a Full Compound in Powder Form Based on NR/E-SBR, N234 and Additions A stable dispersion is produced by initially stirring together 6.0 kg of N234, 0.6 kg of active ZnO, 100 g of Marlipal 1618/25, 0.4 kg of sulfur and 0.06 kg of MBTS in 126.6 L of completely deionized water. An oil solution is also produced from 2.4 kg of oil with 0.4 kg each of stearic acid and 6PPD, 0.2 kg of TMQ, 0.2 kg of Protector G 35, 0.24 kg of TBBS and heated to 75° C. The oil solution is mixed together with 47.85 kg each of a 20.9% NR and a 20.9% E-SBR latex emulsion with vigorous stirring. The above-stated stable dispersion is then added to the latex/oil mixture. The pH value of the mixture is then reduced to 7.0 by addition of an approx. 10% $Al_2(SO_4)_3$ solution (beginning of precipitation). At this pH value, precipitation is interrupted and another stable dispersion prepared from 4 kg of N234 and 96.0 L of completely deionised water is added to the reaction mixture. After this process step, the pH value is further reduced to 6.0 by addition of further quantities of $Al_2(SO_4)_3$. After the precipitation process, the great majority of the water is separated mechanically and a drying stage then reduces the residual moisture content to <1%. The finished pulverulent product contains 100 parts of E-SBR and 50 parts of N234 and all added substances. (F-EPB V)

| Products according to the invention in rubber applications | |
| --- | --- |
| Europrene 1552 | Styrene/butadiene rubber having a styrene content of 19% (Enichem) |
| Europrene N 5564 | Bale masterbatch consisting of Europrene 1552/N234/oil in a 100:52:10 ratio (Enichem) |
| RSS1 | Natural rubber (ribbed smoked sheet) |
| H-EPB I | Semi-compound according to the invention (powdered rubber) consisting of 100 parts of SBR 1552, 48 parts of N234, 11 parts of oil, 5 parts of ZnO, 1 part of stearic acid, 1 part of 6PPD, 1 part of TMQ, 3 parts of resin |
| F-EPB II | Full compound according to the invention, composition as H-EPB I and additionally 1.6 parts of TBBS, 0.2 parts of MBTS, 1.6 parts of sulfur |
| H-EPB III | Semi-compound according to the invention (powdered rubber) consisting of 100 parts of E-SBR, 75 parts of Ultrasil 7000, 6.1 parts of Si 69, 3 parts of ZnO, 25 parts of oil, 1 part of stearic acid, 1.5 parts of 6PPD, 1 part of wax |
| F-EPB IV | Full compound according to the invention, composition as H-EPB II and additionally 1.5 parts of CBS, 2 parts of DPG, 1.5 parts of sulfur |
| F-EPB V | Full compound according to the invention Powdered rubber consisting of 50 parts of NR, 50 parts of SBR, 50 parts of N234, 12 parts of oil, 3 parts of zinc oxide, 2 parts of stearic acid, 2 parts of 6PPD, 1 part of TMQ, 1 part of wax, 1.2 parts of TBBS, 0.3 parts of MBTS, 2 parts of sulfur |
| 6PPD | N-(1,3-dimethylbutyl)-N-phenyl-p-phenylenediamine |
| Ultrasil 7000 Gr | Enhanced dispersion tire silica ($N_2$ surface area approx. 180 $m^2/g$) (Degussa AG) |
| TMQ | 2,2,4-Trimethyl-1,2-dihydroquinoline |
| Si69 | Bis (triethoxysilylpropyl) tetrasulfane |
| TBBS | N-tert.-butyl-2-benzthiazylsulfenamide |
| MBTS | Dibenzothiazyl disulfide |
| Enerthene 1849-1 | Aromatic plasticizer (BP) |
| DPG | Diphenylguanidine |
| CBS | Benzothiazyl-2-cyclohexylsulfenamide |
| E-SBR 1500 | Emulsion styrene/butadiene latex having a styrene content of 23.4% |
| Active ZnO | Zinc oxide having a surface area of 45 $mp^2/g$ |
| Marlipal 1618/25 | Emulsifier: fatty alcohol polyethylene glycol ether (Hüls AG) |
| Rhenosin C 90 | Reinforcing resin |
| Protector G 35 | Ozone protection wax |
| N234 | Carbon black, $N_2$ surface area 125 $m^2/g$ |

Rubber Test Methods

| | |
| --- | --- |
| Tensile bar test | DIN 53 504 |
| Shore hardness | DIN 53 505 |
| 100% modulus | DIN 53 504 |
| 300% modulus | DIN 53 504 |
| Elongation at break | DIN 53 504 |
| Fracture energy | DIN 53 504 |
| Ball rebound | ASTM D5308 |
| $D_{max}$–$D_{min}$ | DIN 53 529 |

Example A
Comparison of Technical Rubber Properties of a Semi-compound (H-EPB I) with a Conventionally Produced Standard Mixture a) Formulation

| Mixture | 1 [phr] | 2 [phr] |
|---|---|---|
| Europrene 1552 | 100 | — |
| H-EPB I | — | 171* |
| N234 | 52 | — |
| ZnO RS | 5 | — |
| Stearic acid | 1 | — |
| Enerthene 1849-1 | 10 | — |
| 6PPD | 1 | — |
| TMQ | 1 | — |
| Rhenosin C 90 | 3 | — |
| TBBS | 1.6 | 1.6 |
| MBTS | 0.2 | 0.2 |
| Sulfur | 1.6 | 1.6 |

*The constituents of the basic batch are present in the powdered rubber b) Mixing Process 1st stage

| | |
|---|---|
| Internal mixer: | GK 1.5 E; volume 1.5 L; friction 1:1; plunger pressure 5.5 bar |
| Mixture | 1　　　　　　　　　　2 |
| Filler content | 0.55 |
| RPM | 50 |
| Flow temperature [° C.] | 60 |
| 0–0.5' | SBR 1552　　　　　Stage omitted |
| 0.5–1.5' | carbon black, oil, ZnO, stearic acid, 6PPD, TMQ, resin |
| 1.5' | Cleaning |
| 1.5–3' | Mixing and discharge |
| Discharge temperature ~ 140° C. | |

2nd stage

| | | | |
|---|---|---|---|
| Internal mixer: | GK 1.5 E; volume 1.5 L; friction 1:1; plunger pressure 5.5 bar; RPM 30; filler content 0.55; flow temperature 60° C. | | |
| 0–0.5' | Batch stage 1, accelerator, sulfur | 0–0.5' | H-EPB I as powder, |
| 1.5' | Discharge | Accelerator, 0.5–1.5' | sulfur Mixing and discharge | c) Vulcanizate Data
Vulcanization temperature: 165° C.
Vulcanization time: 15 min

| Mixture no. | 1 | 2 |
|---|---|---|
| Tensile strength [MPa] | 21.3 | 21.5 |
| 100% modulus [MPa] | 1.8 | 1.9 |
| 300% modulus [MPa] | 9.4 | 10.0 |
| Elongation at break [%] | 500 | 490 |
| Fracture energy [J] | 134 | 138 |
| Shore A hardness | 66 | 66 |

The results demonstrate that is possible, without loss of subsequent technical rubber performance, to add further mixture constituents, in addition to the polymer and filler, during production of the powdered rubber. In this manner, it is possible inter alia to dispense with the energi-intensive 1st mixing stage.

Example B
Comparison of the Technical Rubber Properties of a Full Compound (F-EPB II) with a Conventionally Produced Standard Mixture (Bale Masterbatch, Carbon Black Filled)

a) Formulation

| Mixture | 1 [phr] | 2 [phr] |
|---|---|---|
| Europrene N5564 | 162 | — |
| F-EPB II | — | 174* |
| ZnO RS | 5 | — |
| Stearic acid | 1 | — |
| 6PPD | 1 | — |
| TMQ | 1 | — |
| Rhenosin C 90 | 3 | — |
| TBBS | 1.6 | — |
| MBTS | 0.2 | — |
| Sulfur | 1.6 | — |

*All constituents of the mixture are present in the powdered rubber b) Mixing Process 1st stage

| | |
|---|---|
| Internal mixer: | GK 1.5 E; volume 1.5 L; friction 1:1; plunger pressure 5.5 bar |
| Mixture | 1　　　　　　　　　　2 |
| Filler content | 0.55 |
| RPM | 50 |
| Flow temperature [° C.] | 60 |
| 0–0.5' | Europrene N5564　　Stage omitted |
| 0.5–1.5' | ZnO, stearic acid, 6PPD, TMQ, resin |
| 1.5' | Cleaning |
| 1.5–3' | Mixing and discharge |
| Discharge temperature ~ 140° C. | |

2nd stage

| | | | |
|---|---|---|---|
| Internal mixer: | GK 1.5 E; volume 1.5 L; friction 1:1; plunger pressure 5.5 bar; RPM 30; filler content 0.55; flow temperature 60° C. | | |
| 0–0.5' | Batch stage 1, Accelerator, Sulfur | 0–0.5' | F-EPB II as powder, accelerator, |
| 1.5' | Discharge | 0.5–1.5' | sulfur Mixing and discharge | c) Vulcanizate Data
Vulcanization temperature: 165° C.
Vulcanization time: 15 min

| Mixture no. | 1 | 2 |
|---|---|---|
| Tensile strength [MPa] | 21.6 | 20.8 |
| 100% modulus [MPa] | 1.8 | 1.8 |
| 300% modulus [MPa] | 8.7 | 8.8 |
| Elongation at break [%] | 530 | 510 |
| Fracture energy [J] | 159.8 | 152.8 |
| Shore A hardness | 66 | 65 |
| Ball Rebound | 40.6 | 40.1 |

It is evident from the overall properties of the full compound that chemicals which must otherwise be incorporated into the polymer in an energy-intensive mixing process may be added, without loss of efficacy, during production of the product. In this manner, finished, extrudable mixtures are obtained without having to use a conventional mixing unit (for example internal mixer, roll mill).

Example C
Comparison of the Technical Rubber Properties of a Silica-filled Semi-compound (H-EPB III) with a Conventionally Produced Standard Mixture a) Formulation

| Mixture | 1 [phr] | 2 [phr] |
|---|---|---|
| E-SBR 1500 | 100 | — |
| Ultrasil 7000 Gr. | 75 | — |
| H-EPB III | — | 213.6* |
| Si 69 | 6.1 | — |
| Enerthene 1849-1 | 25 | — |
| ZnO RS | 3 | — |
| Stearic acid | 2 | — |
| 6PPD | 1.5 | — |
| Protector G 35 | 1 | — |
| CBS | 1.5 | 1.5 |
| DPG | 2 | 2 |
| Sulfur | 1.5 | 1.5 |

*All the ingredients of the basic compound were added to the powdered rubber during the production thereof.

b) Mixing Process

| 1st stage | |
|---|---|
| Internal mixer: | GK 1.5 E; volume 1.5 L; friction 1:1; plunger pressure 5.5 bar |

| Mixture | 1 | 2 |
|---|---|---|
| Filler content | 0.55 | 0.6 |
| RPM | 50 | 40 |
| Flow temperature [° C.] | 60 | 60 |

| | | | |
|---|---|---|---|
| 0–0.5' | E-SBR 1500 | 0–1' | H-EPB III |
| 0.5–1' | ½ Ultrasil 7000 Gr, ½ Si 69, oil, ZnO, stearic acid, wax | 1–2.5' | Mixing and discharge |
| 1–2 | ½ Ultrasil 7000 Gr, ½ Si 69, 6PPD | | |
| 2' | Cleaning | | |
| 2–4' | Mixing and discharge | | Discharge temperature ~135° C. |
| Discharge temperature ~140° C. | | | |

| 2nd stage | |
|---|---|
| Internal mixer: | GK 1.5 E; volume 1.5 L; friction 1:1; plunger pressure 5.5 bar; RPM 30; filler content 0.55; flow temperature 60° C. |

| Both mixtures | |
|---|---|
| 0–1.5' | Batch stage 1, accelerator, sulfur |
| 1.5' | Discharge | c) Vulcanizate Data

Vulcanization temperature: 165° C.

Vulcanization time: 15 min

| Mixture no. | 1 | 2 |
|---|---|---|
| Tensile strength [MPa] | 17.7 | 19.2 |
| 100% modulus [MPa] | 1.5 | 1.5 |
| 300% modulus [MPa] | 9.8 | 9.4 |
| Elongation at break [%] | 420 | 520 |
| Fracture energy [J] | 99 | 146 |
| Shore A hardness | 73 | 75 |

In the case of silica-filled mixtures too, it is feasible to add further mixture constituents during the powdered rubber process without loss of efficacy.

Example D

Comparison of the Technical Rubber Properties of a Silica-filled Full Compound (F-EPB IV) with a Conventionally Produced Standard Mixture a) Formulation

| Mixture | 1 [phr] | 2 [phr] |
|---|---|---|
| E-SBR 1500 | 100 | — |
| Ultrasil 7000 Gr. | 75 | — |
| F-EPB IV | — | 219 |
| F-EPB V | — | — |
| Si 69 | 6.1 | — |
| Si 75 | — | |
| Enerthene 1849-1 | 25 | — |
| ZnO RS | 3 | — |
| Stearic acid | 2 | — |
| 6PPD | 1.5 | — |
| Protector G 35 | 1 | — |
| CBS | 1.5 | — |
| DPG | 2 | — |
| Sulfur | 1.5 | — | b) Mixing Process

| 1st stage | |
|---|---|
| Internal mixer: | GK 1.5 E; volume 1.5 L; friction 1:1; plunger pressure 5.5 bar |

| Mixture | 1 | 2 |
|---|---|---|
| Filler content | 0.55 | 0.6 |
| RPM | 50 | 40 |
| Flow temperature [° C.] | 60 | 60 |

| | | | |
|---|---|---|---|
| 0–0.5' | SBR 1500 | 0–1' | F-EPB IV |
| 0.5–1' | ½ Ultrasil 7000, ½ Si 69, oil, ZnO, stearic acid, wax | 1–2.5' | Mixing and discharge |
| 1–2 | ½ Ultrasil 7000, ½ Si 69, 6PPD | | |
| 2' | Cleaning | | |
| 2–4' | Mixing and discharge | | Discharge temperature ~135° C. |
| Discharge temperature ~140° C. | | | |

| 2nd stage | |
|---|---|
| Internal mixer: | GK 1.5 E; volume 1.5 L; friction 1:1; plunger pressure 5.5 bar; RPM 30; filler content 0.53; flow temperature 60° C. |

| Both mixtures | |
|---|---|
| 0–1.5' | Batch stage 1, accelerator, sulfur |
| 1.5' | Discharge | c) Vulcanizate Data

Vulcanization temperature: 165° C.

Vulcanization time: 15 min

| Mixture no. | 1 | 2 |
|---|---|---|
| Tensile strength [MPa] | 17.7 | 18.8 |
| 100% modulus [MPa] | 1.5 | 1.5 |
| 300% modulus [MPa] | 9.8 | 10.0 |
| Elongation at break [%] | 420 | 490 |
| Fracture energy [J] | 99 | 131 |
| Shore A hardness | 73 | 73 |

A white, silica-filled full compound may be produced in the powdered rubber production process without impairing technical rubber performance.

Example E
Comparison of the Data for a Full Compound Based on NR/SBR with a Conventionally Produced Standard Mixture
a) Formulation

| Mixture | 1 [phr] | 2 [phr] |
|---|---|---|
| RSS 1 ML = 70–80 | 50 | — |
| SBR 1500 | 50 | — |
| F-EPB V | — | 176* |
| N234 | 50 | — |
| Enerthene 1849-1 | 12 | — |
| ZnO RS | 3 | — |
| Stearic acid | 2 | — |
| 6PPD | 1.5 | — |
| TMQ | 1 | — |
| Protector G 35 | 1 | — |
| TBBS | 1.2 | — |
| MBTS | 0.3 | — |
| Sulfur | 2 | — |

*The full compound contains all the constituents from mixture 1.

b) Mixing Process

| 1st stage | | |
|---|---|---|
| Internal mixer: | GK 1.5 E; volume 1.5 L; friction 1:1; plunger pressure 5.5 bar | |
| Mixture | 1 | 2 |
| Filler content | 0.55 | |
| RPM | 50 | |
| Flow temperature [° C.] | 60 | |
| 0–0.5' RSS 1, SBR 1500 | | Stage omitted |
| 0.5–1.5' Carbon black, oil, ZnO, stearic acid, 6PPD, TMQ, resin | | |
| 1.5' Cleaning | | |
| 1.5–3' Mixing and discharge | | |
| Discharge temperature ~140° C. | | |

| 2nd stage | | | |
|---|---|---|---|
| Internal mixer: | GK 1.5 E; volume 1.5 L; friction 1:1; plunger pressure 5.5 bar; RPM 30; filler content 0.55; flow temperature 60° C. | | |
| 0–1.5' | Batch stage 1, accelerator, sulfur | 0–0.5' | F-EPB V as powder, accelerator, sulfur |
| 1.5' | Discharge | | |
| | | 0.5–1.5' | Mixing and discharge | c) Vulcanizate Data

Vulcanization temperature: 155° C.
Vulcanization time: 20 min

| Mixture no. | 1 | 2 |
|---|---|---|
| $D_{max}$–$D_{min}$ | 14.4 | 15.3 |
| Tensile strength [MPa] | 18.2 | 18.5 |
| 300% modulus [MPa] | 9.4 | 9.3 |
| Elongation at break [%] | 460 | 460 |
| Fracture energy [J] | 107 | 104 |
| Shore A hardness | 63 | 64 |

It is evident from the overall properties of the full compound that all the chemicals for achieving the overall properties of the full compound standard mixture 1 may be added to the product as early as during the powdered rubber process. No impairment of technical rubber properties is observed.

Further modifications and variations of the invention will be apparent to those skilled in the art from the foregoing and are intended to be encompassed by the claims appended hereto.

German priority application 198 58 706.6 is relied on and incorporated herein by reference.

We claim:

1. A finely divided rubber powder comprising:
   a) a rubber matrix,
   b) one or more white and/or black fillers, optionally modified with one or more organosilicon compounds, whereby the fillers are integrated into rubber particles in such a way that the stickiness of the powder is prevented.

2. A finely divided rubber powder comprising:
   a) a rubber matrix with rubber particles, having an inner particle zone and an outer particle zone,
   b) one or more white and/or black fillers, optionally modified with one or more organosilicon compounds, whereby the fillers are integrated into rubber particles in both the inner and outer zone according to a distribution such that either:
      i) when the inner rubber zone has greater than or equal to 80 parts filler per hundred-parts rubber (phr), the outer particle zone has 1 to 10 parts filler per phr; or
      ii) when the inner rubber particle volume has less than 80 parts filler per phr, the outer rubber particle volume has 10 to 20 parts filler per phr.

3. The rubber powder according to claim 2, further comprising an additive selected from the group consisting of:
   a) zinc oxide and zinc stearate,
   b) stearic acid,
   c) polyalcohols,
   d) polyamines,
   e) resins, waxes, and plasticizing oils,
   f) antioxidants,
   g) flame retardants,
   h) vulcanization accelerators, and
   i) sulfur, optionally modified with a surface-active substance.

4. The rubber powder according to claim 2, wherein solids in the rubber powder are present in a particle size of less than or equal to 50 µm.

5. The rubber powder according to claim 2, wherein the filler is modified with organosilicon compounds having the formulae I, II or III as follows:

$$[(R^1{}_n\text{–}(RO)_{3-n}\text{Si–}(Alk)_m\text{–}(Ar)_p]_q[B] \qquad \text{I,}$$

$$R^1{}_n(RO)_{3-n}\text{Si–}(Alk) \qquad \text{II,}$$

$$R^1{}_n(RO)_{3-n}Si\text{—(Alkenyl)} \qquad \text{III,}$$

wherein

- B: is —SCN, —SH, —Cl, —NH$_2$ (if q=1) or —S$_x$— (if q=2)
- R and R$^1$: are a C$_1$–C$_4$ alkyl or alkoxy group that is branched or unbranched, or phenyl, wherein R and R$^1$ have the same or different meaning,
- n: is 0, 1 or 2,
- Alk: is a divalent linear or branched C$_1$–C$_6$ carbon residue, or monovalent linear or branched, C$_1$–C$_{20}$ hydrocarbon residue
- Ar: is an arylene C$_6$–C$_{12}$ carbon residue,
- Alkenyl: is a monovalent linear or branched, unsaturated C$_2$–C$_{20}$ hydrocarbon residue,
- m: is 0 or 1,
- p: is 0 or 1, providing that p and m are not simultaneously 0, and
- x: is a number from 2 to 8.

6. A process for producing a rubber powder obtained by joint precipitation of a rubber emulsion and an aqueous filler suspension, said suspension incorporating filler optionally utilizing organosilicon compounds having the formulae I, II or III according to claim 5, a water-soluble salt of a metal selected from the group consisting of Group Ia, IIb, IIIa and VIII Metals of the Periodic System of Elements and a rubber latex, optionally in the presence of an organic solvent, said process comprising:

(a) mixing greater than or equal to 50 wt. %, but less than 100 wt. %, of said filler, optionally including a quantity of one or more organosilicon compounds for modification of the filler surface according to the formulae I, II or III in a quantity of 0.1 to 20 wt. %, relative to the filler, optionally in the presence of an emulsifier, with a rubber latex or an aqueous emulsion of a rubber solution and reducing the pH value of the mixture to a value in the range from 7.5 to 6.5, (b) adding a proportion of the above-stated filler, optionally together with the residual quantity intended for modification of the filler surface of organosilicon compounds of the formulae I, II or III, in the form of a suspension, reducing the pH value to a range from 6.5 to 5, such that the rubber present in the mixture completely precipitates together with the filler, (c) separating the precipitate, (d) optionally washing, and (e) drying.

7. The process according to claim 6, wherein the filler is mixed in the form of an aqueous suspension containing 2 to 15% of water.

8. The process according to claim 6, wherein the pH of the mixture is reduced by addition of a Lewis acid.

9. The process according to claim 6, wherein in step (b) the pH is reduced to a value of about 5.5.

10. The process according to claim 6, wherein at a total content of greater than 80 parts of filler per phr in step (a), 1 to 10 parts of this quantity of filler are added in step (b).

11. The process according to claim 6, wherein at a total content of less than 80 parts of filler per phr in step (a), 10 to 20 parts of this quantity of filler are added in step (b).

12. The process according to claim 6, wherein carbon black having an average particle size of 1 to 9 μm is the filler.

13. The process according to claim 6, wherein a white filler is used at least in part in the form of a filter cake which has been washed until salt-free.

14. The process according to claim 13, wherein the white filler is precipitated silica.

15. The process according to claim 6, further comprising adding additional conventional processing and/or vulcanization auxiliaries to the suspension/emulsion before precipitating, providing that the particle size of the added auxiliaries is less than or equal to 50 μm.

16. The process according to claim 15, wherein the particle size is less than or equal to 10 μm.

17. The process according to claim 15, wherein the filler suspension is passed through a grinder before addition of the rubber component.

18. The process according to claim 15, wherein zinc oxide having a surface area of 20 to 50 m$^2$/g is premixed with the filler suspension and added in step (a).

19. The process according to claim 6, wherein one or more additives selected from the group consisting of:

a) zinc oxide and zinc stearate,
b) stearic acid,
c) polyalcohols,
d) polyamines,
e) resins, waxes, and plasticizing oils,
f) antioxidants,
g) flame retardants,
h) vulcanization accelerators, and
i) sulfur, optionally modified with a surface-active substance, are premixed with the latex emulsion or rubber solution or the filler suspension and then the latex emulsion or rubber solution produced in this manner is mixed in step (a) with the filler suspension.

20. The process according to claim 19, wherein a vulcanization accelerator is mixed with the rubber solution, and spraying said rubber solution, in suspended or dissolved form in an oil compatible with the rubber, onto the rubber powder.

21. The process according to claim 20, wherein sulfur added with the vulcanization accelerator.

22. A vulcanizable rubber mixture comprising the finely divided rubber powder according to claim 2.

23. The rubber powder according to claim 2, wherein said powder has a particle size range of 0.05 to 10 mm.

24. The rubber powder according to claim 2, wherein said powder has a particle size range of 0.5 to 2 mm.

25. The rubber powder according to claim 2, wherein said powder contains 20 to 250 phr of filler.

26. The rubber powder according to claim 2, wherein said fillers are incorporated into the surface of each rubber powder particle.

27. A rubber powder produced by the process of claim 6.

* * * * *